US006935030B2

(12) United States Patent
Loik

(10) Patent No.: US 6,935,030 B2
(45) Date of Patent: Aug. 30, 2005

(54) SPIRAL CUT CRAFT TOOL

(76) Inventor: James Loik, 41 North Rd., Kingston, NH (US) 03848

( * ) Notice: Subject to any disclaimer, the term of this patent is extended or adjusted under 35 U.S.C. 154(b) by 14 days.

(21) Appl. No.: 10/027,695

(22) Filed: Dec. 20, 2001

(65) Prior Publication Data

US 2003/0115759 A1 Jun. 26, 2003

(51) Int. Cl.[7] ............................ B26B 27/00; B23B 3/06
(52) U.S. Cl. ........................... 30/90.1; 30/124; 82/70.2; 82/78; 82/83; 82/101
(58) Field of Search .................... 30/90.1, 124; 82/101, 82/70.2, 78, 83

(56) References Cited

U.S. PATENT DOCUMENTS 403,521 A * 5/1889 Cutlan ......................... 142/56
3,082,523 A 3/1963 Modes et al.
3,535,785 A 3/1963 Matthews
3,595,107 A * 7/1971 Dackow ...................... 82/113
3,636,805 A * 1/1972 Somma et al. ................ 82/157
3,686,982 A 8/1972 Bull
3,886,655 A * 6/1975 Molnar ....................... 30/90.3
3,940,842 A 3/1976 Perrinelle et al.
4,489,491 A 12/1984 Gregson
4,548,114 A * 10/1985 Sauer .......................... 83/391
4,665,616 A 5/1987 Orecchio
4,769,910 A 9/1988 Noon
4,958,542 A * 9/1990 Skerrett ....................... 82/113
5,074,043 A 12/1991 Mills
5,412,902 A * 5/1995 Hicks ........................ 43/44.87
5,740,612 A 4/1998 Takeshita et al.
6,098,290 A 8/2000 Sorkin

* cited by examiner

*Primary Examiner*—Allan N. Shoap
*Assistant Examiner*—Isaac Hamilton

(57) ABSTRACT

A spiral cut craft tool and method of making a spiral cut is provided. The spiral cut craft tool has a housing with a cutting guide in the housing. A cutting edge is provided that is projecting into the cutting guide. The cutting edge is coupled to the housing. The cutting guide is adapted to constrain a hollow straw having a centerline from lateral movement at the cutting guide while also allowing the straw to be rotated about the centerline. The cutting edge cuts a spiral cut in the hollow straw when the housing is rotated about the centerline of the hollow straw.

30 Claims, 12 Drawing Sheets

FIG. 1
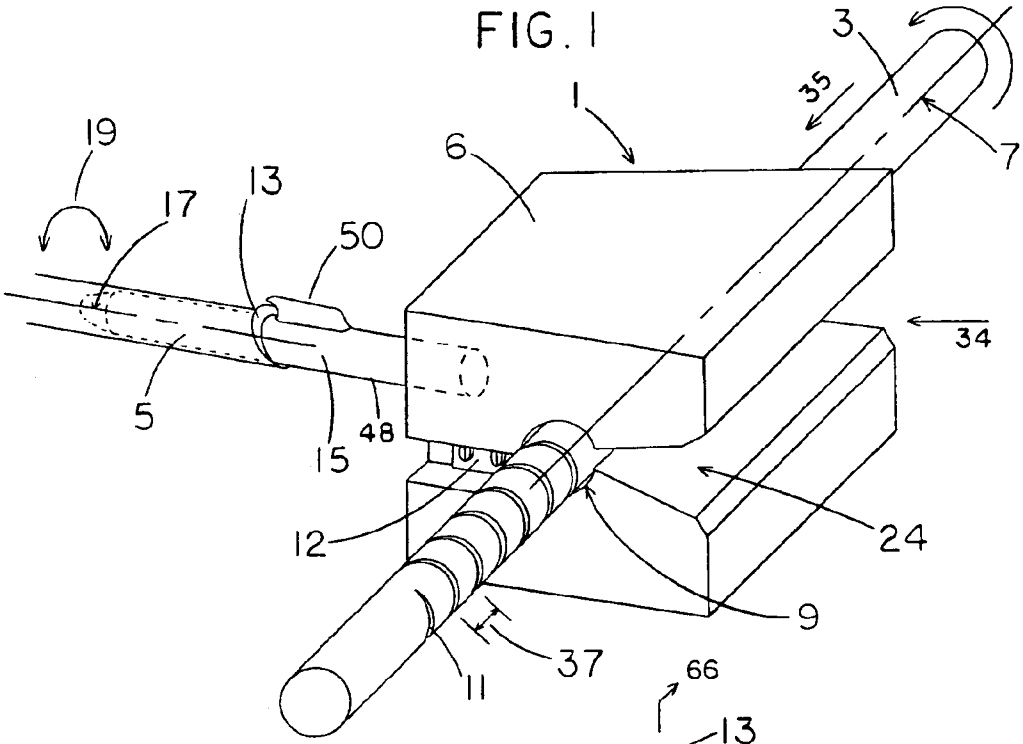
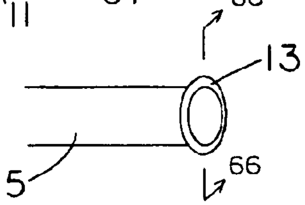
FIG. 2A
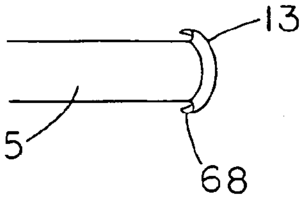
FIG. 2B

FIG. 3
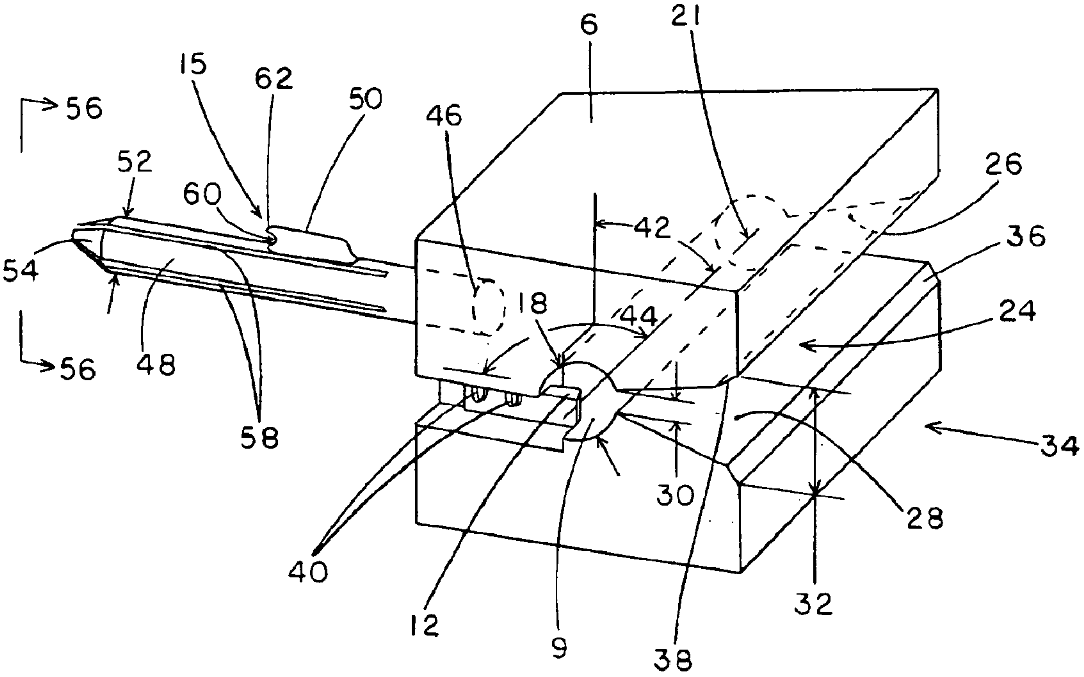
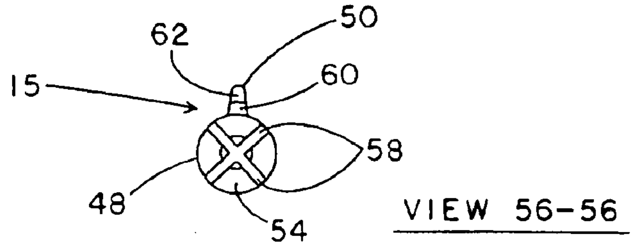
FIG. 4

FIG. 7A
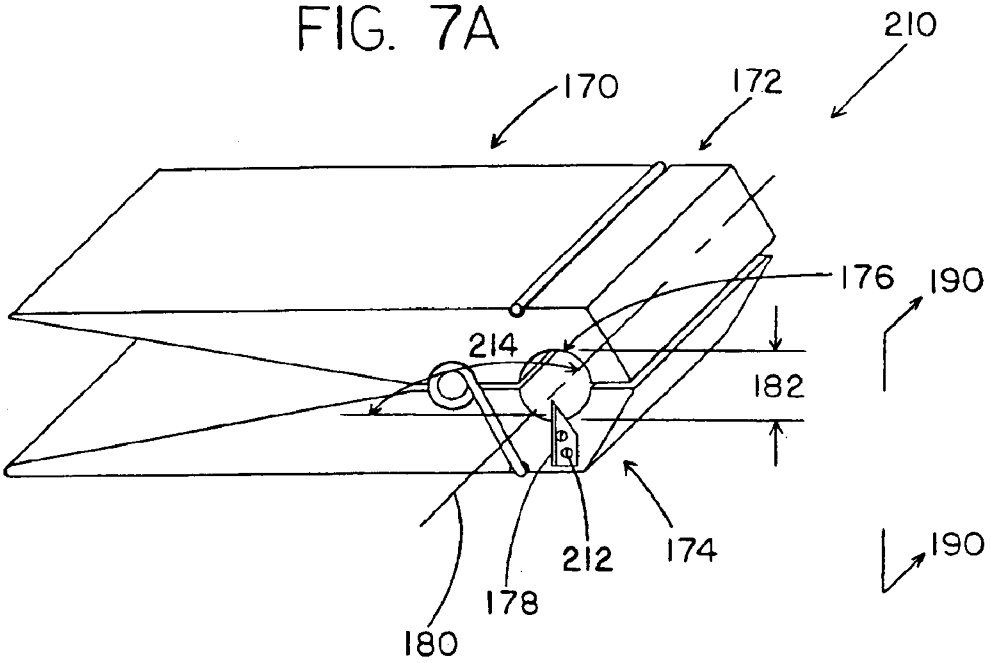
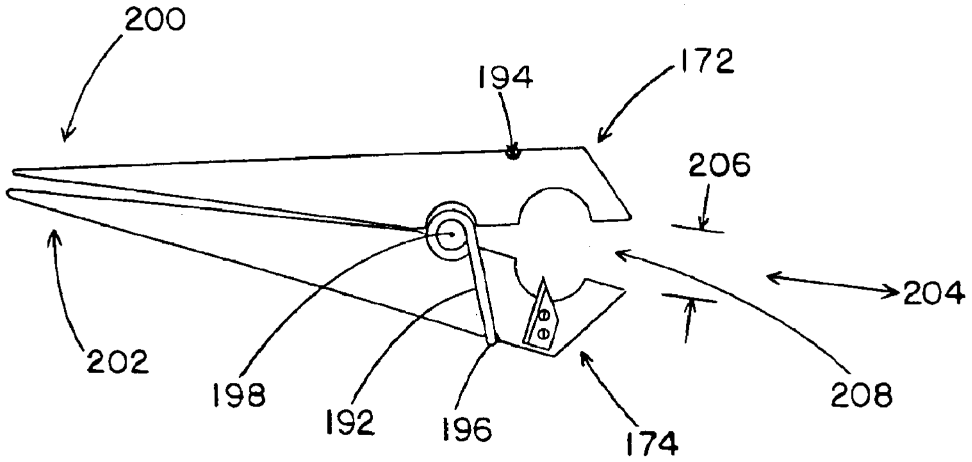
FIG. 7B

SPIRAL CUT CRAFT TOOL

BACKGROUND OF THE INVENTION

FIELD OF THE INVENTION

The present invention relates to a spiral cut craft tool, and, more specifically to a spiral cut craft tool adapted to cut spiral cuts in hollow straws.

SUMMARY OF THE INVENTION

In accordance with one embodiment of the present invention, a straw cutting spiral cut craft tool is provided. The straw cutting spiral cut craft tool has a housing with a cutting guide in the housing. A cutting edge is provided that is projecting into the cutting guide. The cutting edge is coupled to the housing. The cutting guide is adapted to constrain a hollow straw having a centerline from lateral movement at the cutting guide while also allowing either the cutting edge or the straw to be rotated about the centerline. The cutting edge cuts a spiral cut in the hollow straw.

In accordance with another embodiment of the present invention, a straw cutting spiral cut craft tool is provided. The straw cutting spiral cut craft tool has a cutting guide. The cutting guide is adapted to constrain a hollow straw having a centerline from substantial lateral movement. A cutting edge is provided projecting into the cutting guide. A secondary component is provided and moveable relative to the cutting guide. The secondary component is adapted to further guide the hollow straw. An angle between the cutting edge and the centerline is changeable when the secondary component is moved relative to the cutting guide. The cutting edge is adapted to cut a spiral cut in the hollow straw.

In accordance with one method of the present invention a method of making a straw craft is provided comprising the steps of cutting or crimping a spiral cut in a hollow straw and cutting or crimping a first end of the first hollow straw.

In accordance with another embodiment of the present invention, a straw cutting spiral cut craft tool is provided. The straw cutting spiral cut craft tool has a housing with a cutting guide in the housing. A cutting edge is provided that is projecting into the cutting guide. The cutting edge is coupled to the housing. The cutting guide is adapted to constrain a hollow straw having a centerline from lateral movement at the cutting guide while also allowing either the cutting edge or the straw to be rotated about the centerline. The cutting edge cuts a spiral cut in the hollow straw. The cutting edge allows an angle between the centerline and the cutting edge to be changeable. A pitch of the spiral cut may vary when the angle is changed.

In accordance with another embodiment of the present invention, a straw cutting spiral cut craft tool is provided. The straw cutting spiral cut craft tool has a housing with a cutting guide in the housing. A cutting edge is provided that is projecting into the cutting guide. The cutting edge is coupled to the housing. The cutting guide is adapted to constrain a hollow straw having a centerline from lateral movement at the cutting guide while also allowing either the cutting edge or the straw to be rotated about the centerline. The cutting guide is open or may be opened to accept the hollow straw laterally into the cutting guide. The cutting edge cuts a spiral cut in the hollow straw.

In accordance with another embodiment of the present invention, a straw cutting spiral cut craft tool is provided. The straw cutting spiral cut craft tool has a housing with a cutting guide in the housing. A cutting edge is provided that is projecting into the cutting guide. The cutting edge is coupled to the housing. The cutting guide is adapted to constrain a hollow straw having a centerline from lateral movement at the cutting guide while also allowing either the cutting edge or the straw to be rotated about the centerline. The cutting guide is changeable in size to accommodate more than one size of hollow straw. The cutting edge cuts a spiral cut in the hollow straw.

BRIEF DESCRIPTION OF THE DRAWINGS

The foregoing aspects and other features of the present invention are explained in the following description, taken in connection with the accompanying drawings, wherein:

FIG. 1 is an isometric view of a straw cutting spiral cut craft tool showing a first straw being cut and a second straw being rounded over;

FIG. 2A is an isometric view of the second straw after it has been rounded over;

FIG. 2B is a sectioned isometric view of the second straw after it has been rounded over;

FIG. 3 is a detailed isometric view of a spiral cut craft tool;

FIG. 4 is an end view of a rounding mandrel;

FIG. 7A is an isometric view of a spiral cut craft tool according to a second alternative embodiment;

FIG. 7B is a side view of the spiral cut craft tool of FIG. 7A;

DETAILED DESCRIPTION OF THE EMBODIMENTS

Figure 5A:
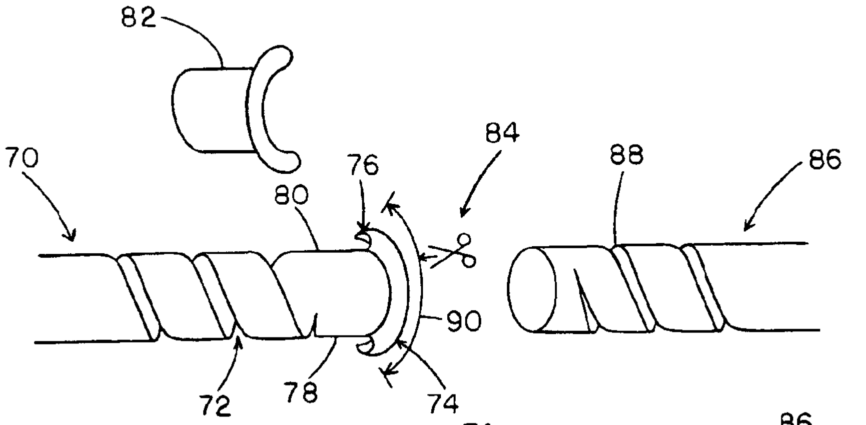
FIG. 5A is a side view of two straws being joined.

For the purposes of this disclosure, the term "hollow straw" describes a hollow tube made of a semi-rigid porous or non-porous material such as plastic, paper or otherwise which may be suitable for drinking purposes or for purposes of making decorative articles or crafts with the present invention.

Referring now to FIG. 1 there is shown an isometric view of spiral cut craft tool 1 with a first straw 3 being cut and a second straw 5 being rounded over according to the present invention. Although the present invention will be described with reference to the embodiments shown in the drawings, it should be understood that the present invention can be embodied in many alternate forms of embodiments. In addition, any suitable size, shape or type of elements or materials could be used.

The spiral cut craft tool 1 has a housing 6 with a cutting guide 9 bored in the housing. A cutting edge 12 is provided in housing 6 that is projecting into the cutting guide 9. The cutting guide 9 is adapted to constrain hollow straw 3 having a centerline 7 from lateral movement at the cutting guide while also allowing straw 3 to be rotated about the centerline. The cutting edge 12 cuts a spiral cut 11 in hollow straw 3 when the housing 6 is rotated about the centerline of hollow straw 3. A rounding mandrel 15 is coupled to the housing 6. Rounding mandrel 15 has a forming bit 50 projecting from rod 48. The rounding mandrel is adapted to form an end 13 which is rounded over on the hollow straw 5 when the hollow straw 5 is rotated about the centerline 17 in direction 19 relative to the rounding mandrel 15. Alternately, the rounding mandrel may also flare the end of a straw. Pressure applied to the rounding mandrel in the direction of centerline 17 by the straw during rotation effects forming the end 13. A tapered slot 24 is cut into housing 6. The hollow straw 3 may be inserted into slot 24 laterally in direction 34, which is substantially perpendicular to centerline 7, to be constrained in guide 9 at cutting edge 12 for a cutting operation. Alternately, the hollow straw 3 may be inserted into the opposing side of cutting guide 9 in direction 35. The angle between centerline 7 and the surface of blade 12 may be angled typically ninety degrees or less. The less the angle between centerline 7 and the cutting surface of blade 12, the greater the resulting pitch 37 of spiral cut 11 in straw 3.

Referring now to FIG. 2A there is shown an isometric view of the second straw 5 after it has been rounded over. End 13 is rounded over on the hollow straw 5 over the entire circumference of end 13 when the hollow straw 5 is rotated about the centerline 17 in direction 19 relative to the rounding mandrel 15.

Referring now to FIG. 2B there is shown a sectioned isometric view 66-66 of the second straw 5 after it has been rounded over. End 13 is rounded over on the hollow straw 5 forming a scrolled radius 68 as shown over the circumference of end 13.

Referring now to FIG. 3, there is shown an isometric view of a spiral cut craft tool 1 according to the present invention. The spiral cut craft tool 1 has a housing 6 with a cutting guide 9 in the housing. A cutting edge 12 is provided in housing 6 that is projecting into the cutting guide 9. The cutting edge 12 may project into cutting guide 9 as shown, or may alternately be in a different orientation or project completely through cutting guide 9 in the same or different orientation. In an alternate embodiment, cutting edge 12 may be movable or retractable relative to cutting guide 9 in order to allow the straw to be moved in the guide axially relative to housing 6 without having to spiral cut the straw such as in the case where the user wants intermittent cut(s) on the straw. The cutting guide 9 is adapted to constrain a hollow straw (not shown) having a centerline from substantial lateral movement at the cutting guide while also allowing the straw to be rotated about the centerline. The cutting edge 12 cuts a spiral cut in the hollow straw when the housing 6 is rotated about the centerline of the hollow straw or when the straw is rotated relative to the housing. A rounding mandrel 15 is coupled to the housing 6. The rounding mandrel is adapted to form an end which is rounded over on the hollow straw when the hollow straw is pressed and rotated about the centerline relative to the rounding mandrel 15. Housing 6 may be made of metal, plastic, wood or other suitable material. Housing 6 may be machined, molded or otherwise fabricated from a single material or from multiple materials. The rounding mandrel, cutting edge or other additional features may be formed or molded as part of housing 6. Housing 6 has a cutting guide 9 located at cutting edge 12 as a diameter 18 cut in housing 6. Diameter 18 is bored through housing 6 along centerline 21 and could be sized slightly larger than the outside diameter of a hollow straw suitable for spiral cut in spiral cut craft tool 6. Although the cutting guide 9 is shown as a diameter bored through housing 6, alternately the cutting guide may be any alternate shape such as a cone or surface(s) adapted to suitably constrain a straw during a spiral cut. A tapered slot 24 defined by surfaces 26 and 28 is cut into housing 6 and diameter 18. The tapered slot allows a straw to be inserted into the tool without having to spiral cut the end or ends of the straw. In an alternate embodiment, the tapered slot may not be provided. The base of tapered slot 24 has width 30 at the cutting edge 12 which may be less than the diameter of the hollow straw to be cut. The entrance of tapered slot 24 has width 32 at the cutting edge 12 which is typically, but need not be greater than the diameter of the hollow straw to be cut. Since width 30 at the cutting edge 12 is less than the diameter of the hollow straw to be cut, the hollow straw may be inserted laterally in direction 34, which is substantially perpendicular to centerline 21, into slot 24 to be constrained in guide 9 at cutting edge 12 for a cutting operation. In an alternate embodiment, tapered slot may be formed such that the hollow straw may be constrained at the cutting edge but allowed to be rotated on an axis different from axis 21. Tapered slot 24 may be chamfered at 36 and 38 to further facilitate insertion of a hollow straw into the housing 6. Cutting edge 12 is shown fastened to housing 6 with fasteners 40. Cutting edge 12 is shown as a steel blade, but may alternately be any cutter suitable for cutting hollow straws. Fasteners 40 are shown as screws, but may alternately be any fastener suitable to attach cutting edge 12 to housing 6. Alternately, cutting edge 12 may be molded in housing 6 or molded or fabricated as part of housing 6. Cutting edge 12 may have an angle 42 which typically will be ninety degrees or less. Angle 42 may be set at ninety degrees to allow the straw to be "cut off", such that a straw may be cut in half or in segments. Angle 42 is typically measured as the angle between centerline 21 to the cutting surface of blade 12 that is at the tangent where the blade cuts the hollow straw or where the blade surface intersects the hollow straw. In alternate embodiments, angle 42 may be more or less than ninety degrees. Angle 44 is typically measured as the angle between centerline 21 to the cutting edge or surface of blade 12 as shown. Angle 44 may be ninety degrees. In alternate embodiments, angle 44 may be more or less than ninety degrees. Rounding mandrel 15 is coupled to the housing 6 at joint 46. Rounding mandrel 15 be made of metal, plastic, wood or other suitable material. Rounding mandrel 15 may be machined, molded or otherwise fabricated from a single material or from multiple materials and may be formed or molded as part of housing 6. In alternate embodiments, rounding mandrel 15 may be removably coupled to or separate from spiral cut craft tool 1. Rounding mandrel 15 has a rod 48 and a forming bit 50 projecting from rod 48. Rod 48 has a diameter 52 which may be less than the inside diameter of the hollow straws to be cut or rounded over. Rod 48 may have a tapered nose 54 that facilitates sliding a hollow straw over rod 48 at tapered nose 54. Rod 48 may have slots 58 cut to allow the overall diameter 52 of rod 48 to vary such that hollow straws with different inside diameter may be slid over rod 48. Forming bit 50 has a forming surface 60 which may be a radius that terminates at tip 62.

Referring now to FIG. 4, there is shown an end view 56—56 of rounding mandrel 15. Rounding mandrel 15, as shown has a rod 48 and a forming bit 50 projecting from rod 48. Tapered nose 54 that facilitates sliding a hollow straw over rod 48 at tapered nose 54. Slots 58 allow the overall diameter of rod 48 to vary such that hollow straws with different inside diameter may be slid over rod 48. Forming bit 50 has a forming surface 60 which may be a radius that terminates at tip 62.

Referring now to FIG. 5A there is shown a side view of two straws being joined. The joining shown in FIG. 5A applies also to joining the two ends of a single straw or string of joined straws. End 74 of the first hollow straw 70 is rounded over forming a scrolled radius 76 as shown over the circumference of end 74. The rounding over of end 74 can be made by a spiral cut craft tool 1 as shown in FIG. 1 and FIG. 3 or by other suitable means. Hollow straw 70 may have a spiral cut 72 along a portion of its length. The spiral cut 72 can be made by a spiral cut craft tool 1 as shown in FIG. 1 and FIG. 3 or by other suitable means. Cuts 78 and 80 are made on the end 74 of hollow straw 70 to remove portion 82 of hollow straw 70 and leaving portion 90 on end 74. Cuts 78 and 80 may be made by scissors 84 or by other suitable means. Second hollow straw 86 has a spiral cut 88 along a portion of its length. The spiral cut 88 can be made by a spiral cut craft tool 1 as shown in FIG. 1 and FIG. 3 or by other suitable means.

Figure 5B:
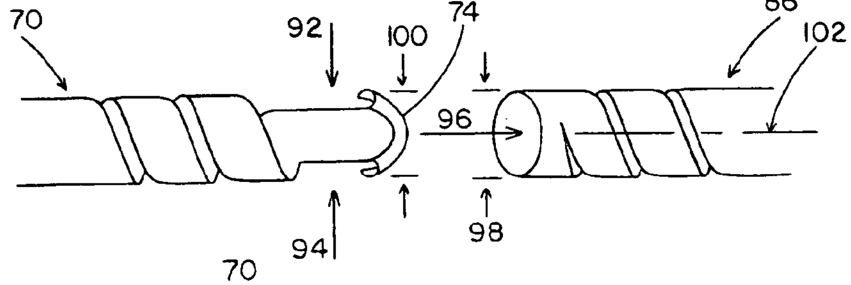
FIG. 5B is a side view of two straws being joined.

Referring now to FIG. 5B there is shown a side view of two straws being joined. The joining shown in FIG. 5B applies also to joining the two ends of a single straw or string of joined straws. First hollow straw 70 is compressed at its end 74 along direction 92/94 such that the height 100 of end 74 is less than inside diameter 98 of second straw 86. First hollow straw 70 is inserted along the centerline 102 of second hollow straw 86 in the direction 96 as shown.

Figure 5C:
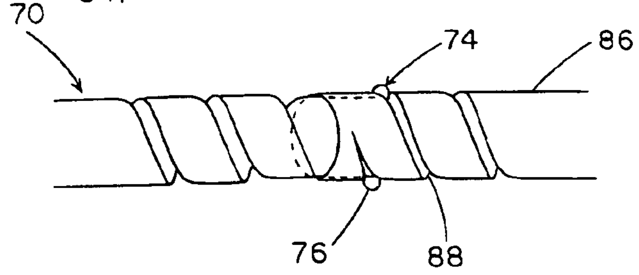
FIG. 5C is a side view of two straws after being joined.

Referring now to FIG. 5C there is shown a side view of two straws after being joined. The joining shown in FIG. 5C applies also to joining the two ends of a single straw or string of joined straws. End 74 of first hollow straw 70 has returned to the shape it had before being compressed allowing scrolled radius 76 to engage spiral cut 88 of second hollow straw 86. In this manner, first hollow straw 70 is joined to second hollow straw 86.

Figure 6:
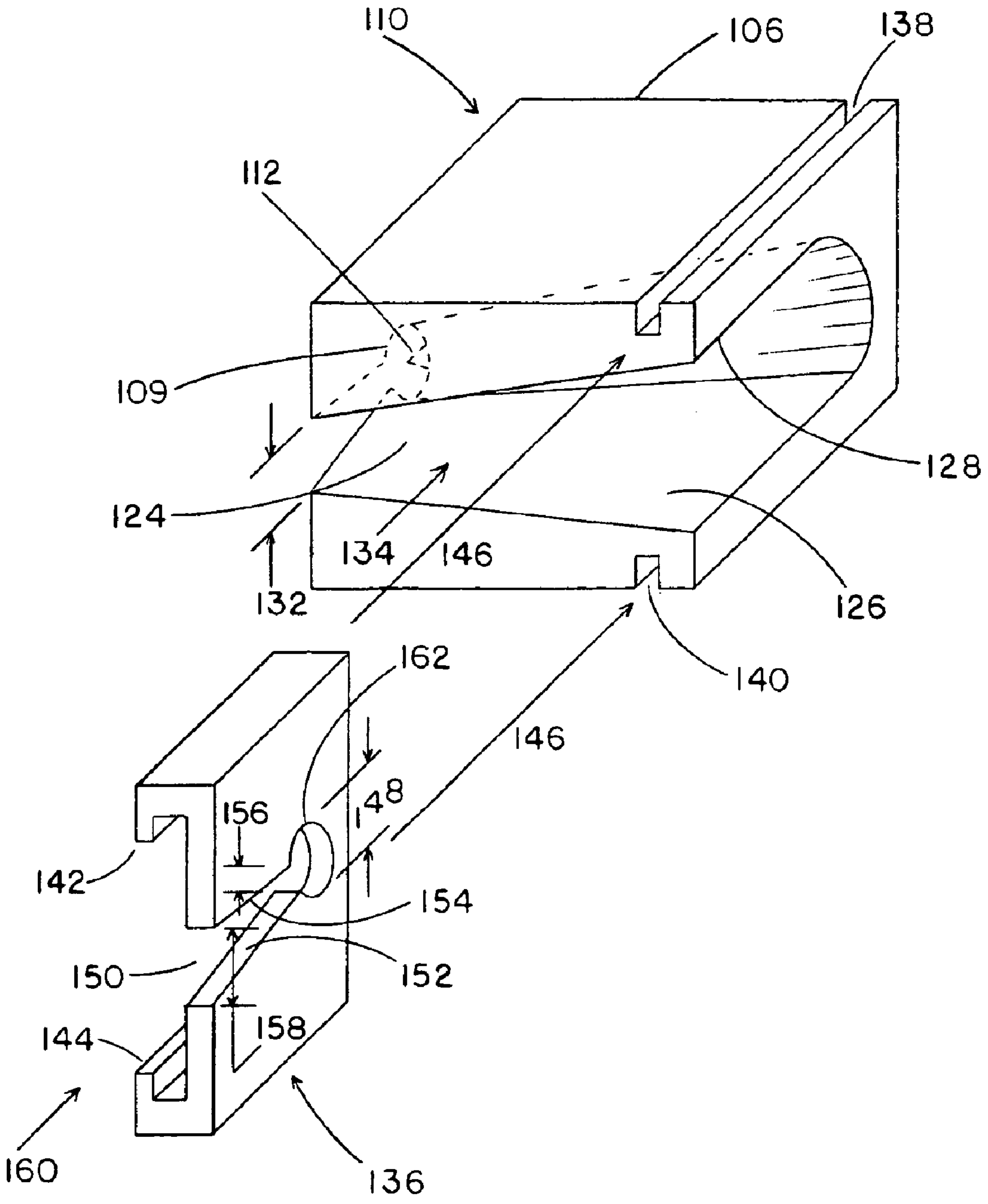
FIG. 6 is an isometric view of a spiral cut craft tool according to a first alternative embodiment.

Referring now to FIG. 6 there is shown an isometric view of a spiral cut craft tool 110 according to a first alternative embodiment of the present invention. The spiral cut craft tool 110 has a housing 106 with a cutting guide 109 (shown in phantom) in the housing. A cutting edge 112 (shown in phantom) is provided in housing 106 that is projecting into the cutting guide 109. The cutting guide 109 is adapted to constrain a hollow straw (not shown) having a centerline from lateral movement at the cutting guide while also allowing the straw to be rotated about the centerline. The cutting edge 112 cuts a spiral cut in the hollow straw when the housing 106 is rotated about the centerline of the hollow straw. A rounding mandrel may be coupled to the housing 106, but is not shown. Housing 106 has opposing guide slots 138 and 140 cut as shown. Housing 106 may be made of metal, plastic, wood or other suitable material. Housing 106 may be machined, molded or otherwise fabricated from a single material or from multiple materials. Housing 106 has a cutting guide 109 located at cutting edge 112 as a diameter cut in housing 106. The diameter would typically be sized slightly larger than the diameter of a hollow straw suitable for spiral cut in spiral cut craft tool 106. A tapered slot 124 defined by surfaces 126 and 128 is cut into housing 106. The entrance of tapered slot 124 has width 132 at the cutting edge 112 which is typically, but need not be greater than the diameter of the hollow straw to be cut. Since the width at the cutting edge 112 is less than the diameter of the hollow straw to be cut, the hollow straw may be inserted laterally in direction 134 into slot 124 to be constrained in guide 109 at cutting edge 112 for a cutting operation. Cutting edge 112 is shown as a steel blade, but may alternately be any cutter suitable for cutting hollow straws. Secondary housing 136 has guide rails 142 and 144 which mate with opposing guide slots 138 and 140 of housing 106 when secondary housing is mated with housing 106 in direction 146. Diameter 148 is bored through secondary housing 136 and would be sized slightly larger than the diameter of a hollow straw suitable for spiral cut in spiral cut craft tool 110. A tapered slot 150 defined by surfaces 152 and 154 is cut into secondary housing 136 and diameter 148. The base of tapered slot 150 has width 156 which is less than the diameter of the hollow straw to be cut. The entrance of tapered slot 150 has width 158 which is typically, but need not be greater than the diameter of the hollow straw to be cut. Since width 156 is less than the diameter of the hollow straw to be cut, the hollow straw may be inserted laterally in direction 160 into slot 150 to be constrained in guide 162 for a cutting operation. When secondary housing 136 is mated with housing 106, a hollow straw may be inserted and guided by both guides 162 and 109. The angle between the centerline of the hollow straw and cutting edge 112 may selectively be changed by then sliding secondary housing 136 relative to housing 106. By changing the angle between the centerline of the hollow straw and cutting edge 112 during a spiral cut, the resulting pitch of the spiral cut may selectively be altered accordingly by sliding secondary housing 136 relative to housing 106.

Referring now to FIG. 7A there is shown an isometric view of a spiral cut craft tool 170 according to a second alternative embodiment of the present invention. The spiral cut craft tool 170 has a housing comprising two pieces, first casing 172 and second casing 174. Cutting guide 176 is bored through first casing 172 and second casing 174. Cutting edge 178 is provided in the second casing 174 that is projecting into the cutting guide 176. The cutting guide 176 is adapted to constrain a hollow straw having a centerline from lateral movement at the cutting guide while also allowing the straw to be rotated about the centerline 180. A hollow straw may be inserted in direction 210 into guide 176 and advanced to cutting edge 178 for a cutting operation. The cutting edge 178 cuts a spiral cut in the hollow straw when the housing 172, 174 is rotated about the centerline of the hollow straw. Cutting edge 178 is shown as a steel blade, but may alternately be any cutter suitable for cutting hollow straws. Fasteners 212 are shown as screws, but may alternately be any fastener suitable to attach cutting edge 178 to second casing 174. Alternately, cutting edge 178 may be molded in second casing 174 or molded or fabricated as part of second casing 174. Cutting edge 178 may have an angle 214 which typically will be ninety degrees or less. Angle 214 is typically measured as the angle between centerline 180 to the cutting surface of blade 178 that is at the tangent where the blade cuts the hollow straw. A rounding mandrel may be coupled to the housing 172, 174, but is not shown. As in all embodiments, the less angle 214, the greater the resulting pitch of the spiral cut in the hollow straw. First Casing 172 or second casing 174 may be made of metal, plastic, wood or other suitable material. . First Casing 172 or second casing 174 may be machined, molded or otherwise fabricated from a single material or from multiple materials. First Casing 172 and second casing 174 has a cutting guide 176 located at cutting edge as a diameter 182 cut in first Casing 172 and second casing 174. The diameter would be sized slightly larger than the diameter of a hollow straw suitable for spiral cut in spiral cut craft tool 170. In an alternate embodiment, the diameter could be sized slightly smaller than the diameter of a hollow straw suitable for spiral cut in spiral cut craft tool 170 as the flexibility provided by the spring allows the channel to open slightly therefore allowing a straw with a diameter larger than the channel as initially bored to be spiral cut.

Referring now to FIG. 7B there is shown a side view 190—190 of a spiral cut craft tool 170 according to the second alternative embodiment of the present invention. A torsion spring 192 applies force to first casing 172 at point 194 and to second casing 174 at point 196. Torsion spring 192 also acts as a hinge allowing first casing 172 and second casing 174 to rotate about pivot 198. When no external pressure is applied, spiral cut craft tool is normally in the position shown in FIG. 7A. When there is external pressure applied as shown at points 200 and 202, first casing 172 and second casing 174 rotate about pivot 198 and spread apart guide 176 forming opening 208 allowing a hollow straw to be inserted or removed in direction 204. Opening 208 has width 206 at the cutting edge 112 which is typically, but need not be greater than the diameter of the hollow straw to be cut. As in previous embodiments, opening 208 allows a cut to be initiated on the straw somewhere other than the end of the straw.

Figure 8:
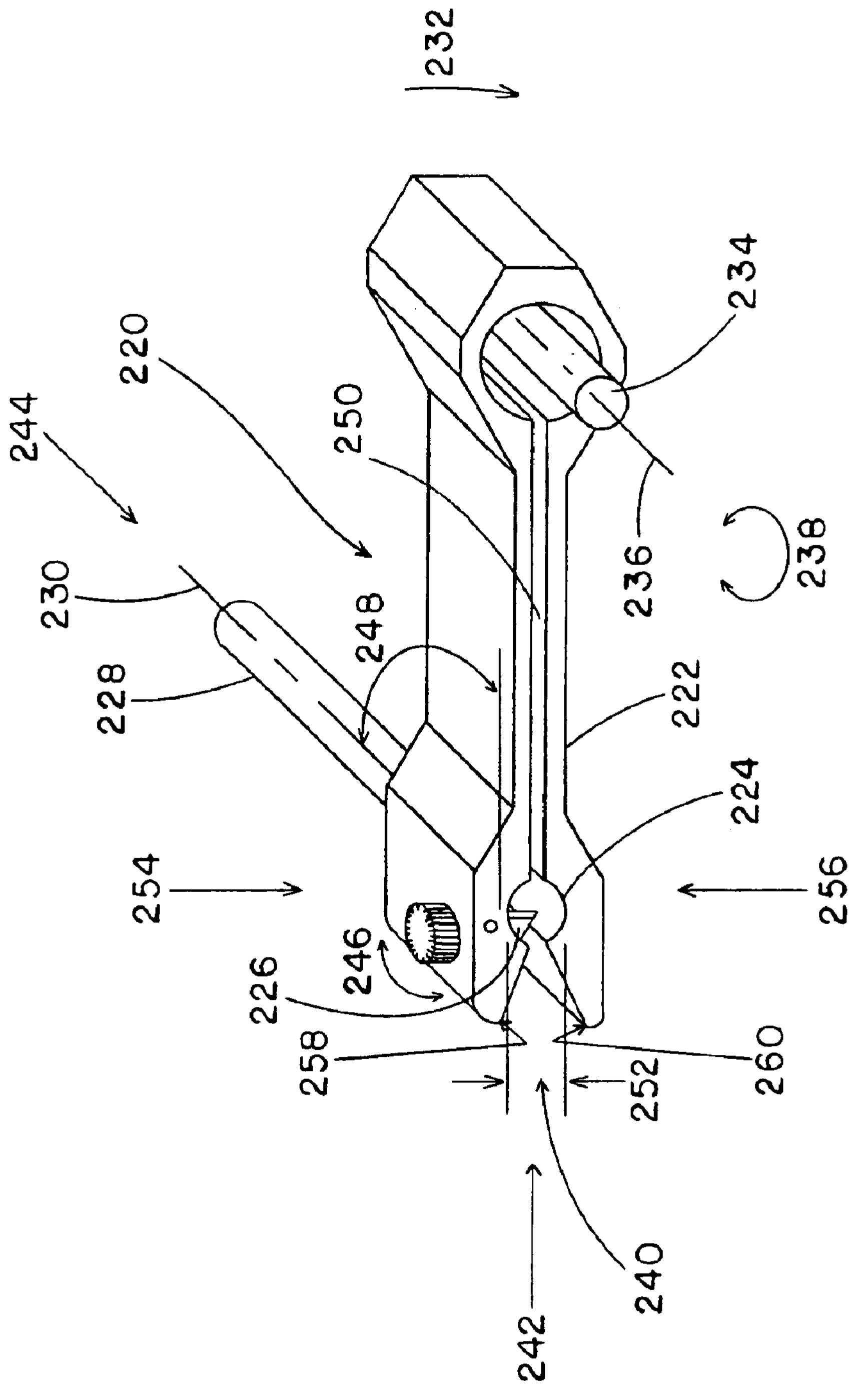
FIG. 8 is an isometric view of a spiral cut craft tool according to a third alternative embodiment.

Referring now to FIG. 8 there is shown an isometric view of spiral cut craft tool 220 according to a third alternative embodiment of the present invention. The spiral cut craft tool 220 has a housing 222 with a cutting guide 224 bored in the housing. A cutting edge 226 is provided in housing 222 that is projecting into the cutting guide 224. The cutting guide 224 is adapted to constrain hollow straw 228 having a centerline 230 from lateral movement at the cutting guide while also allowing straw 228 to be rotated about the centerline. The guide 224 may be sized to accommodate the smallest in a range of straws to be cut with the tool without the need to apply additional pressure to close the channel. Larger sized straws will cause guide 224 to open, but the natural spring of housing 222 may be sufficient to keep the channel 224 snug about the straw without additional pressure being applied to close the channel. In the case where larger straws with a diameter larger than the opening of guide 224, the guide 224 may spread open during cutting to accommodate the difference in size. The cutting edge 226 cuts a spiral cut in hollow straw 228 when the housing 222 is rotated about the centerline 230 of hollow straw 228 in direction 232. A rounding mandrel 234 is coupled to the housing 222. The rounding mandrel 234 is adapted to form an end which is rounded over on a hollow straw when the hollow straw is rotated about the centerline 236 in direction 238 relative to the rounding mandrel 234. A tapered slot 240 is cut into housing 222. A hollow straw may be inserted into slot 240 laterally in direction 242, which is substantially perpendicular to centerline 230, to be constrained in guide 224 at cutting edge 226 for a cutting operation. Alternately, a hollow straw may be inserted into the opposing side of housing 222 in direction 244 as shown. A slot 250 is cut the length of housing 222 allowing dimension 252 to close when pressure is applied to housing 222 in directions 254 and 256 and also allowing dimension 252 to open when a hollow straw is inserted in opening 240 or where pressure is applied in directions 258 and 260 by a hollow straw or other means. The blade of cutting edge 226 may be rotated in direction 246, the rotation changes the angle 248 between centerline 230 and the surface of the blade of cutting edge 226 and may be angled typically ninety degrees or less. The less the angle between centerline 230 and the cutting surface of the blade of cutting edge 226 the greater the resulting pitch of the spiral cut in the straw.

Figure 9B:
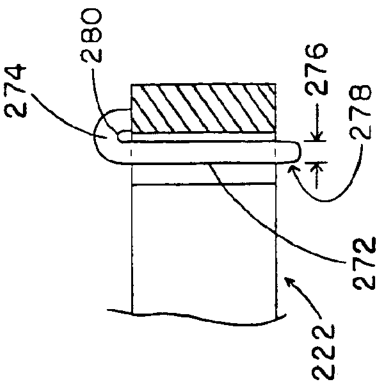
FIG. 9B is a section view of the spiral cut craft tool of FIG. 8 showing a rounding mandrel.
Figure 9A:
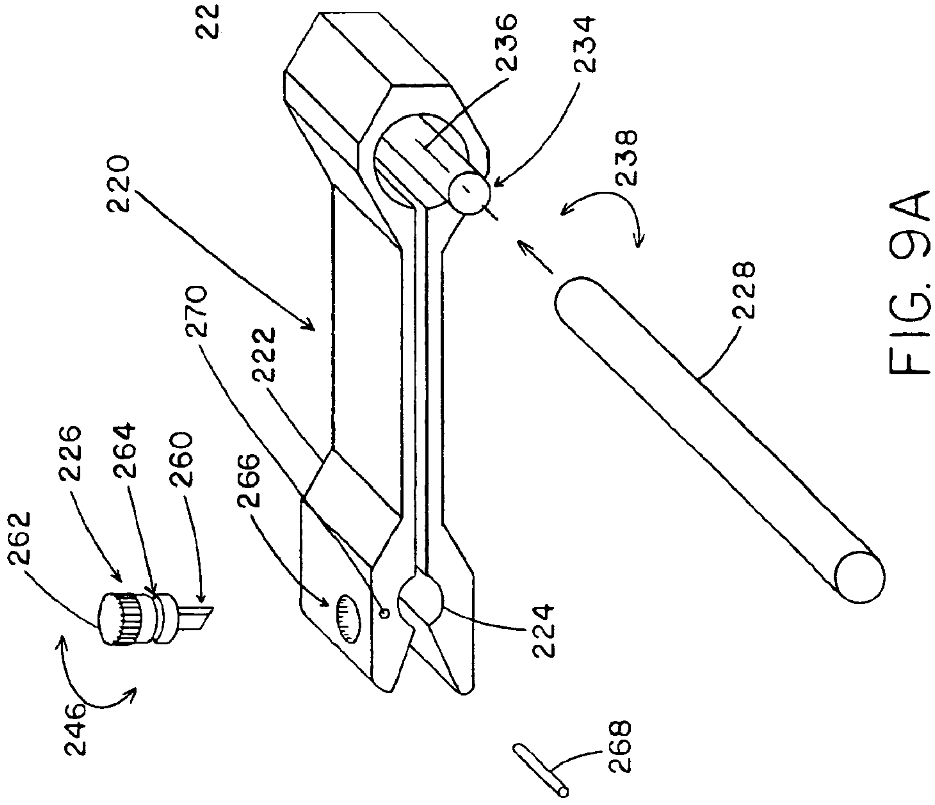
FIG. 9A is an exploded isometric view of the spiral cut craft tool of FIG. 8.

Referring now to FIG. 9A there is shown an exploded isometric view of spiral cut craft tool 220 according to the third alternative embodiment of the present invention shown in FIG. 8. The spiral cut craft tool 220 has a housing 222 with a cutting guide 224 bored in the housing. Housing 222 may be made of metal, plastic, wood or other suitable material. Housing 222 may be machined, molded or otherwise fabricated from a single material or from multiple materials. The cutting edge 226 is shown removed from housing 222. The cutting edge 226 has a blade 260 mounted on a knob 262. Knob 262 may be knurled as shown to allow the user to easily rotate it in direction 246 as be fore described. A groove 264 is turned in knob 262 as shown. A bore 266 is provided in housing 222 to allow cutting edge 226 to be inserted in housing 222 as shown in FIG. 8. When cutting edge 226 is inserted in housing 222 as shown in FIG. 8, pin 268 is inserted in bore 270 and engages slot 264, thus retaining cutting edge 226 axially in housing 222 while allowing cutting edge 226 to be rotated by the user. Blade 260 cuts a spiral cut in a hollow straw when the housing 222 is rotated about the centerline of a hollow straw. The blade 260 of cutting edge 226 may be rotated in direction 246, the rotation changes the angle between the hollow straw centerline and the surface of the blade 260 angled typically ninety degrees or less. The less the angle between the centerline of the hollow straw and the cutting surface of the blade 260 of cutting edge 226 the greater the resulting pitch of the spiral cut in the straw. A rounding mandrel 234 is coupled to the housing 222. The rounding mandrel 234 is adapted to form an end which is rounded over on a hollow straw when the hollow straw is rotated about the centerline 236 in direction 238 relative to the rounding mandrel 234.

Referring now to FIG. 9B there is shown an partial section view of the spiral cut craft tool 220 showing showing rounding mandrel 234 according to the third alternative embodiment of the present invention shown in FIG. 9A and FIG. 8. Rounding mandrel 234 has a rod 272 shaped to form a forming bit 274. Rod 272 has a diameter 276 which may be less than the inside diameter of the hollow straws to be cut and/or rounded over. Rod 272 may have a tapered nose 278 that facilitates sliding a hollow straw over rod 272 at tapered nose 278. Rod 272 may have slots cut to allow the overall diameter 276 of rod 272 to vary such that hollow straws with different inside diameter may be slid over rod 272. Forming bit 274 has a forming surface 280 that may be a radius. Forming bit 274 is coupled to housing 222 as shown. Forming bit 274 may be made of metal, plastic, wood or other suitable material. Forming bit 274 may be machined, molded or otherwise fabricated from a single material or from multiple materials or alternately may be molded as part of housing 222.

Figure 10A:
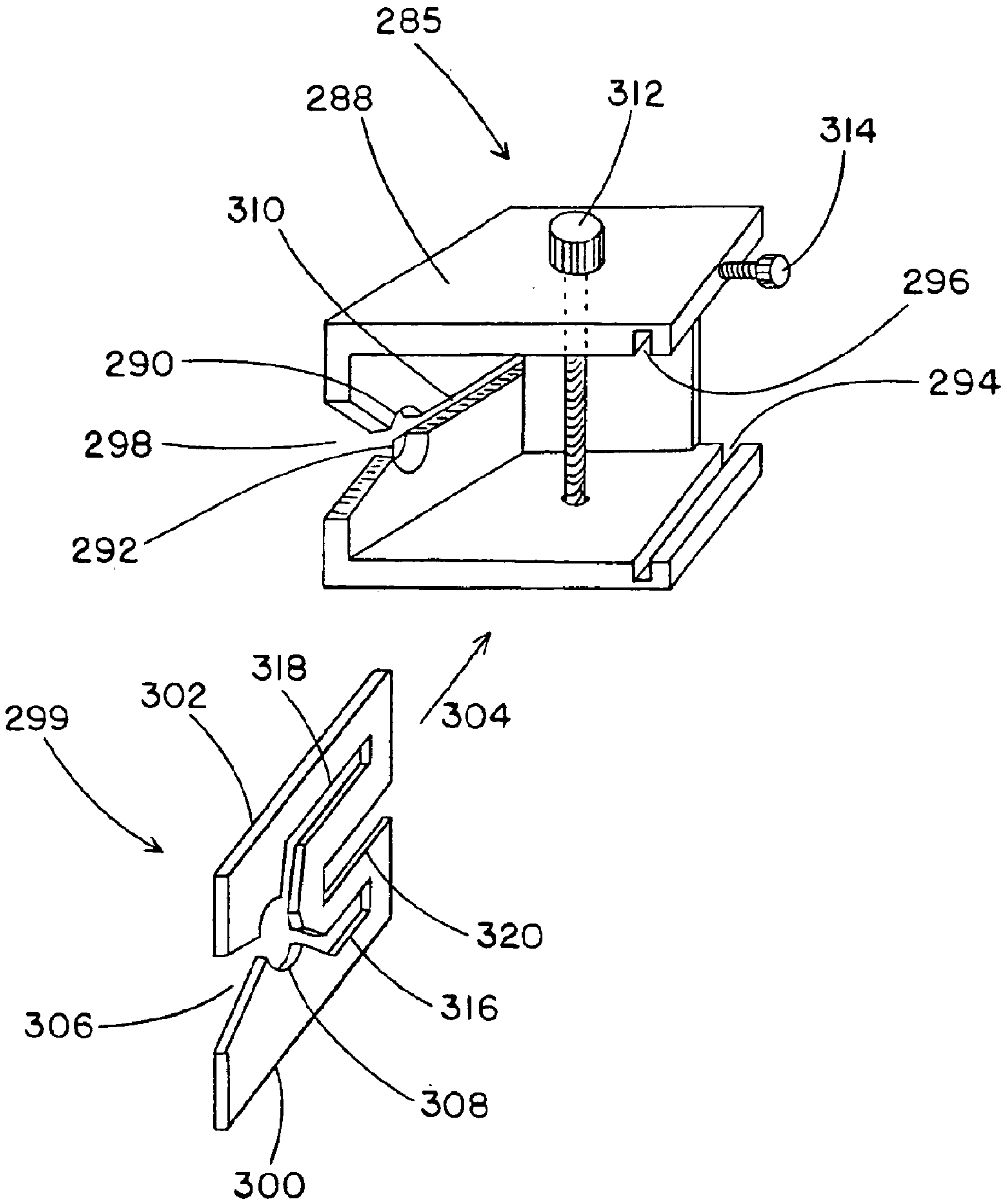
FIG. 10A is an isometric view of a spiral cut craft tool according to a fourth alternative embodiment.

Referring now to FIG. 10A there is shown an isometric view of a spiral cut craft tool 285 according to a fourth alternative embodiment of the present invention. The spiral cut craft tool 285 has a housing 288 with a cutting guide 290 in the housing. A cutting edge 292 is provided in housing 288. A rounding mandrel or otherwise may be coupled to the tool 285, but is not shown. Housing 288 has opposing guide slots 294 and 296 cut as shown. Housing 288 has a cutting guide 290 located at cutting edge 292 as a diameter cut in housing 288. A tapered slot 298 and slot 310 is cut into housing 288. Screw 312 may be tightened or loosened to selectively close or open the width of slot 298 and slot 310 as well as guide 290 allowing various sizes of straws to be accommodated. Secondary component 299 has sides 300 and 302 which mate with opposing guide slots 294 and 296 when secondary component 299 is mated with housing 288 in direction 304. Screw 314 may be used as a stop or as a clamping screw to hold secondary component 299 in a fixed position relative to housing 288. A tapered slot 306 and slots 316, 318 and 320 are cut into secondary component 299. Screw 312 may be tightened or loosened to selectively close or open the width of slots 306, 316, 318 and 320 as well as guide 308 allowing various sizes of straws to be accommodated. When secondary component 299 is mated with housing 288, a hollow straw may be inserted and guided by both guides 290 and 308. The angle between the centerline of the hollow straw and cutting edge 292 may selectively be changed by then sliding secondary component 299 relative to housing 288. By changing the angle between the centerline of the hollow straw and cutting edge 292 during a spiral cut, the resulting pitch of the spiral cut may selectively be altered accordingly by sliding secondary component 299 relative to housing 288.

Figure 10B:
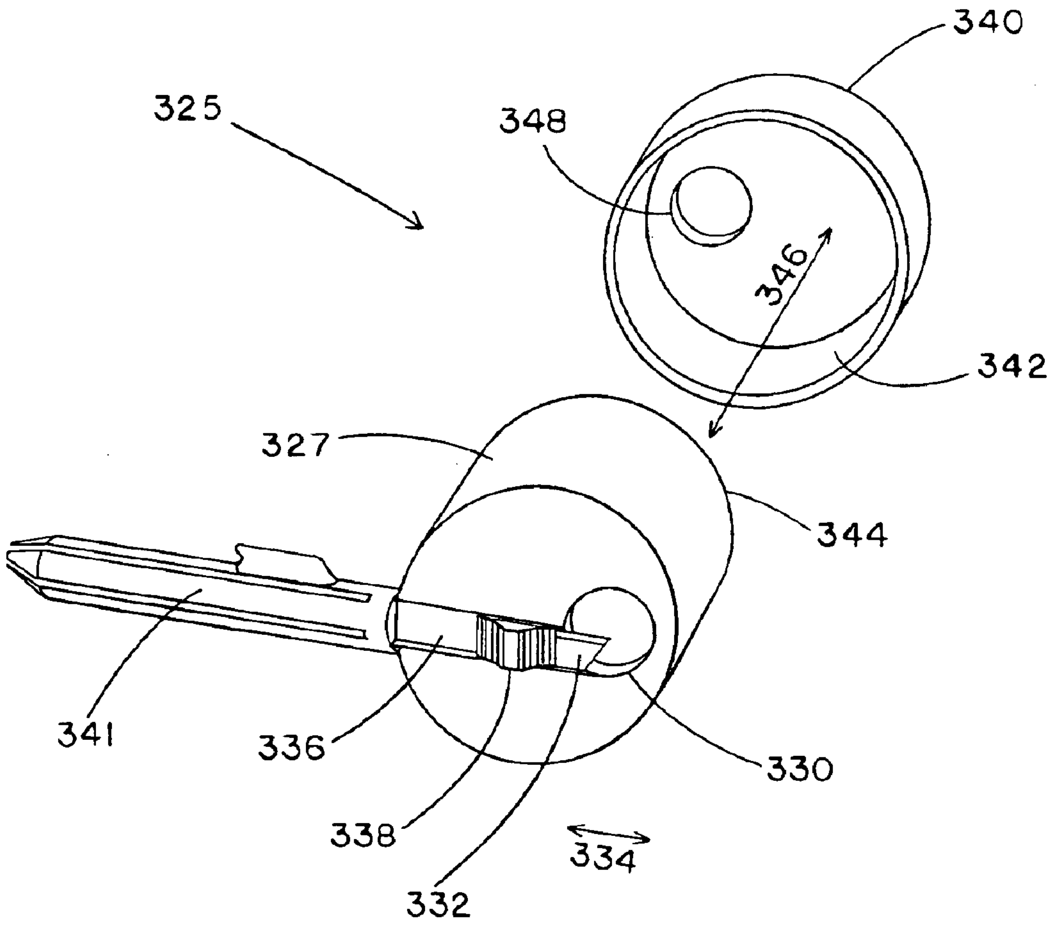
FIG. 10B is an isometric view of a spiral cut craft tool according to a fifth alternative embodiment.

Referring now to FIG. 10B there is shown an isometric view of a spiral cut craft tool 325 according to a fifth alternative embodiment of the present invention. The spiral cut craft tool 325 has a housing 327 with a cutting guide 330 as a diameter in the housing. A cutting edge 332 is provided in housing 327. Cutting edge 332 is slideable along direction 334 from the cutting position (shown) to a retracted position where a straw may be inserted into cutting guide 330 without having to spiral cut the straw until after partial insertion. Cutting edge 332 is slideable in slot 336 using thumb area 338. Cutting edge 332 is shown in a cutting position and may be spring loaded to stay in the cutting position or may be spring loaded to be in the retracted position absent user movement. A rounding mandrel 341 as described in previous embodiments is shown coupled to the tool 325. Secondary housing 340 has mating flange 342 which mates with coupling flange 344 when secondary housing 340 is mated with housing 327 in direction 346. Secondary housing 340 has a guide 348 shown as a diameter through secondary housing 340. When secondary housing 340 is mated with housing 327, a hollow straw may be inserted and guided by both guides 348 and 330. The angle between the centerline of the hollow straw and cutting edge 332 may selectively be changed by then rotating secondary housing 340 relative to housing 327. By changing the angle between the centerline of the hollow straw and cutting edge 332 during a spiral cut, the resulting pitch of the spiral cut may selectively be altered accordingly by rotating secondary housing 340 relative to housing 327.

Figure 11A:
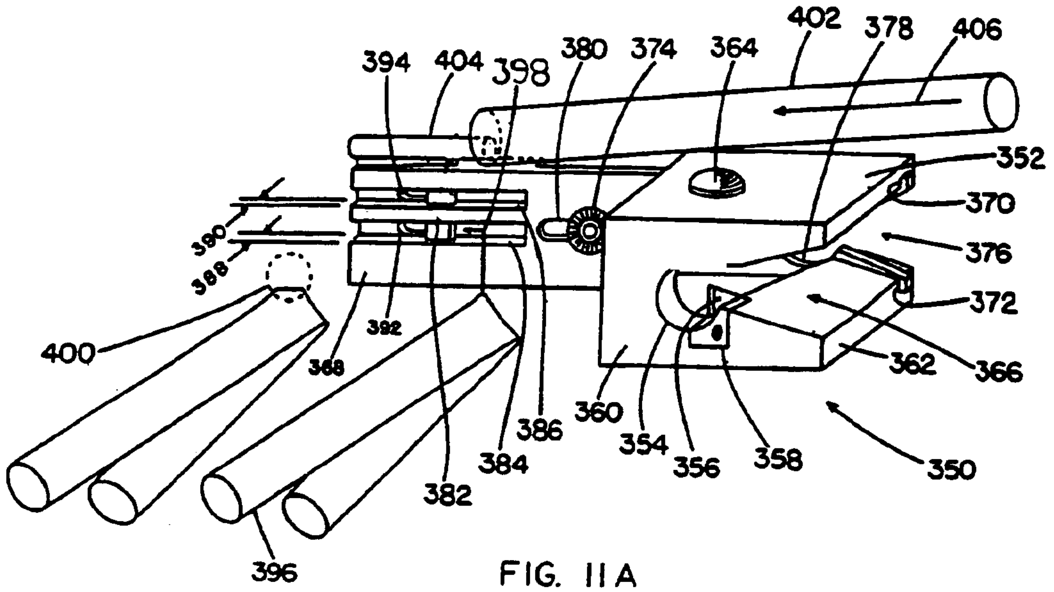
FIG. 11A is an isometric view of a spiral cut craft tool according to a sixth alternative embodiment.

Referring now to FIG. 11A there is shown an isometric view of a spiral cut craft tool 350 according to a sixth alternative embodiment of the present invention. The spiral cut craft tool 350 has a housing 352 with a cutting guide 354 in the housing. A cutting edge 356 is provided in housing 352. Cutting edge 356 is held in place by retaining component 358. Cutting edge 356 is recessed relative to surfaces 360 and 362, for example, for safety purposes in order to prevent accidental cutting of the user or otherwise by cutting edge 356. A rounding mandrel 364 is shown coupled to housing 352. Rounding mandrel 364 is shown as a domed button like structure and may be formed or molded as part of housing 352. In an alternative embodiment, a rounding mandrel like that previously described may be coupled to the tool. Housing 352 has a cutting guide 354 located at cutting edge 356 as a diameter cut in housing 352. A tapered slot 366 is cut into housing 352 for the purpose of allowing a straw to be guided into the cutting tool to allow spiral cuts on an intermediate portion of the straw. Secondary component 368 is slideable relative to housing 352 and mates with opposing guide slots 370 and 372. Slide lock 374 may be used allow placement and repeatable positioning of secondary component 368 relative to housing 352. Slide lock 374 is slideable relative to secondary component 368 in slot 380 and may be locked in slot 380. A tapered slot 376 is cut into secondary component 368. When secondary component 368 is mated with housing 352, a hollow straw may be inserted and guided by both guides 378 and 354. The angle between the centerline of the hollow straw and cutting edge 356 may selectively be changed by then sliding secondary component 368 relative to housing 352. By changing the angle between the centerline of the hollow straw and cutting edge 356 before or during a spiral cut, the resulting pitch of the spiral cut may selectively be altered accordingly by sliding secondary component 368 relative to housing 352. A trimming edge 382 is provided for secondary trimming operations on straws. Trimming edge 382 is shown molded as part of secondary component 368, but may alternately be mounted to or part of housing 352 or otherwise. Alternately, the features associated with trimming edge 382 may be incorporated into housing 352 and cutting edge 356 used for both the functions associated with spiral cutting and those associated with trimming edge 382. Slitting guides 384 and 386 are slotted in secondary component 368 and may have different depths 388 and 390 respectively to allow deeper cuts of portions of straws. Ejection holes 392 and 394 may also be provided to allow ejection of the cut portion of a straw. In order to notch a straw, straw 396 is inserted and cut along direction 398 with a resulting notched out straw portion 400 as shown. Axial cuts of straw 402 may be accomplished by sliding straw 402 along guide mandrel 404 as shown in direction 406.

Figure 11B:
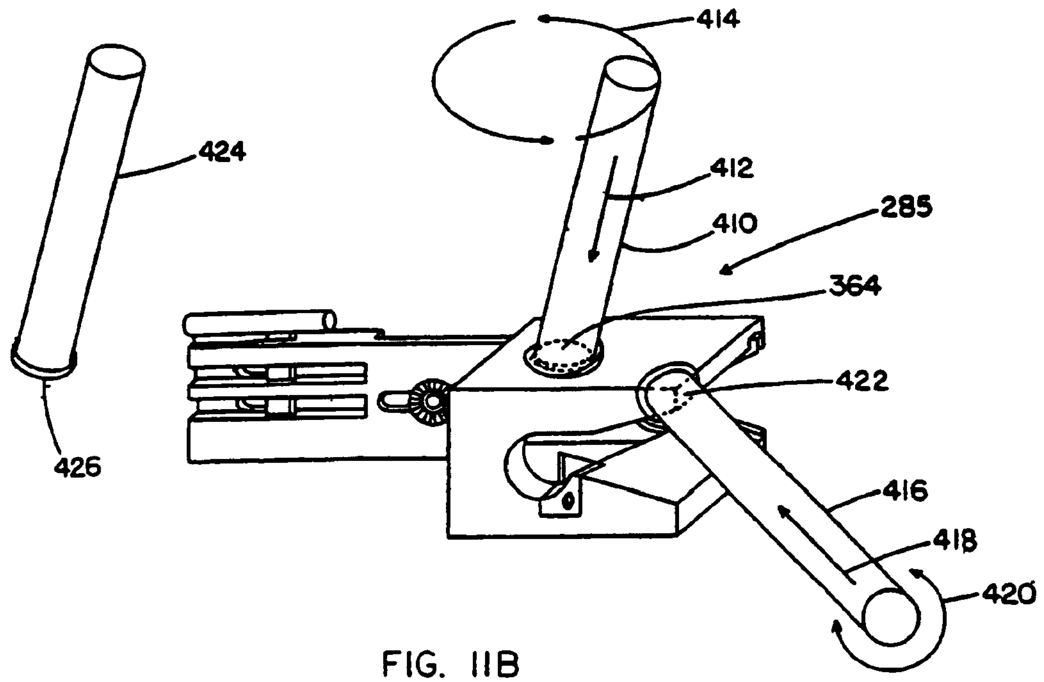
FIG. 11B is an isometric view of the spiral cut craft tool of FIG. 11A showing rounding over of straws.

Referring now to FIG. 11B there is shown an isometric view of the spiral cut craft tool 285 according to the sixth alternative embodiment of the present invention where a flaring and then rounding over feature is shown. The end of straw 416 may be flared by applying pressure in direction 418 against tapered portion or corner 422 and rotating straw 416 in direction 420 relative to corner 422. Tapered portion or corner 422 may be made with any shape or angle suitable for flaring the end of straw 416. The flared end of straw 410 may then be rounded over by applying pressure in direction, 412 against rounding mandrel 364 and rotating straw 410 in direction 414 relative to rounding mandrel 364. Straw 424 is shown with a typically rounded over end 426.

Figure 11C:
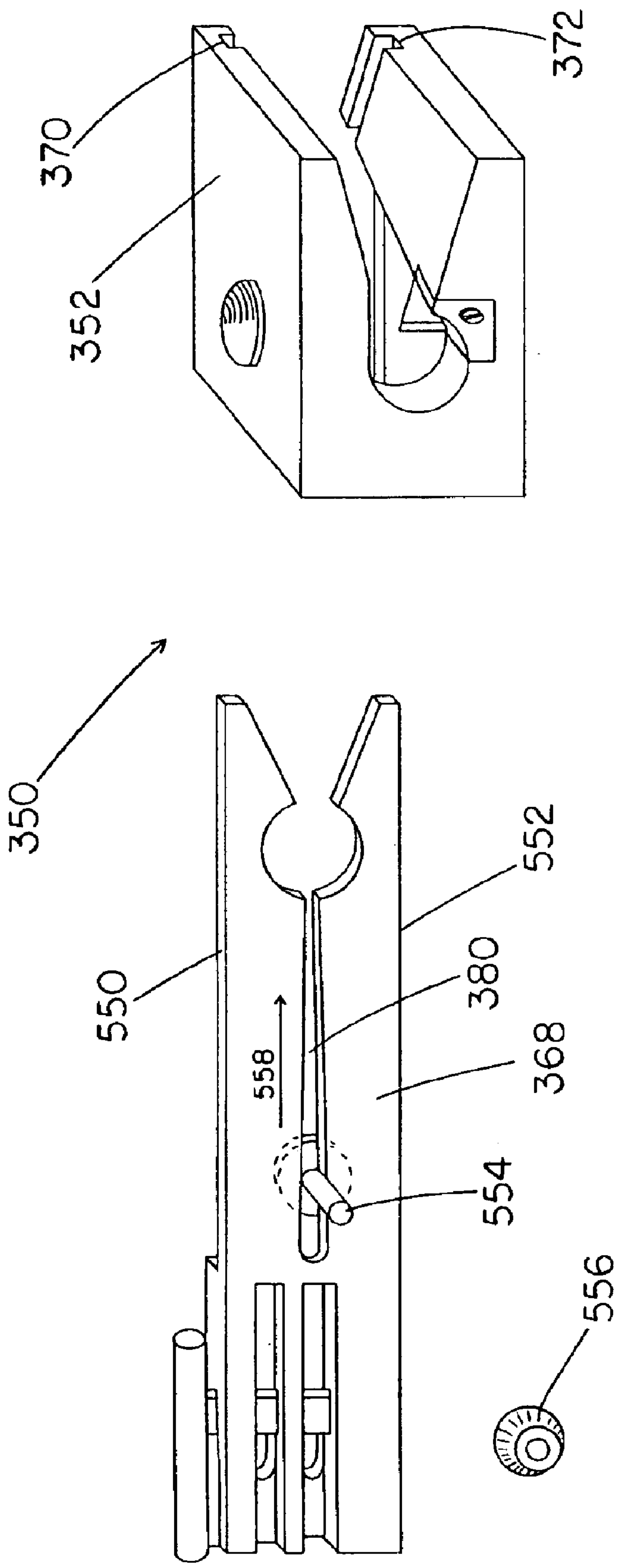
FIG. 11C is an exploded isometric view of the spiral cut craft tool of FIG. 11A.

Referring now to FIG. 11C there is shown an exploded isometric view of a spiral cut craft tool 350 according to the sixth alternative embodiment of the present invention. The spiral cut craft tool 350 is shown with housing 352 separated from secondary component 368. Spiral cut craft tool 350 may be used with housing 352 separated from secondary component 368 where each may perform their intended tasks independent of the other. In alternate embodiments, the features incorporated in housing 352 or secondary component 368 or otherwise shown in the embodiments may be interchanged on housing 352 or secondary component 368 or incorporated in separate tools without departing from the scope of the invention. When slide lock 374 (shown as post 554 and knob 556) is moved in direction 558 within the tapered slot 380, upper and lower surfaces 550, 552 of secondary component 368 may be spread to lock secondary component 368 in slots 370 and 372 respectively. In alternate embodiments, a rubber compression spacer may be placed in slot 380 allowing pressure between upper and lower surfaces 550, 552 of secondary component 368 and slots 370 and 372 respectively allowing secondary component 368 to be slid relative to housing 352 when the friction is overcome.

Figure 12B:
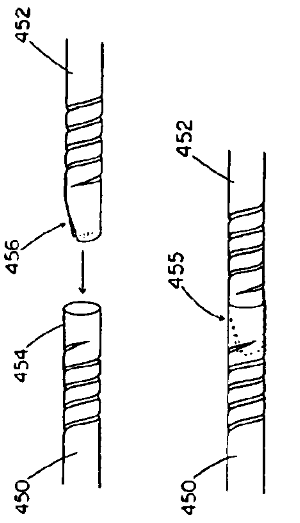
FIG. 12B is a side view of joined straws.
Figure 12C:
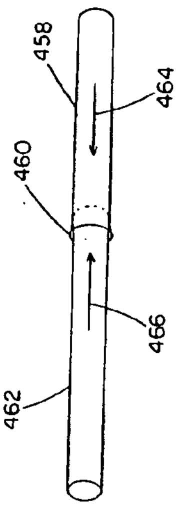
FIG. 12C is a side view of joined straws.
Figure 12E:
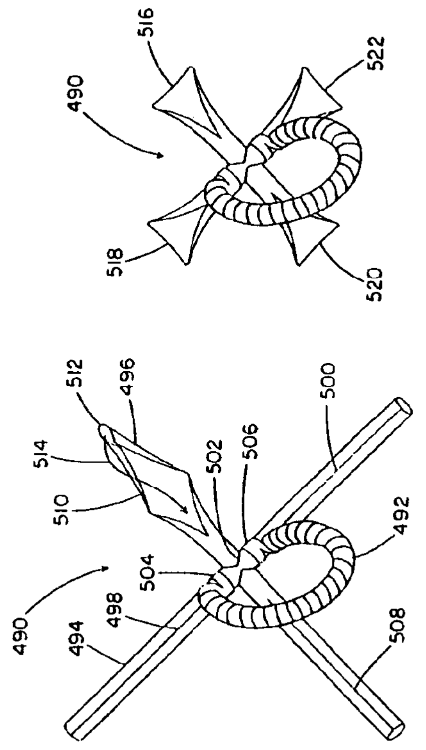
FIG. 12E is a view of a straw craft.
Figure 12A:
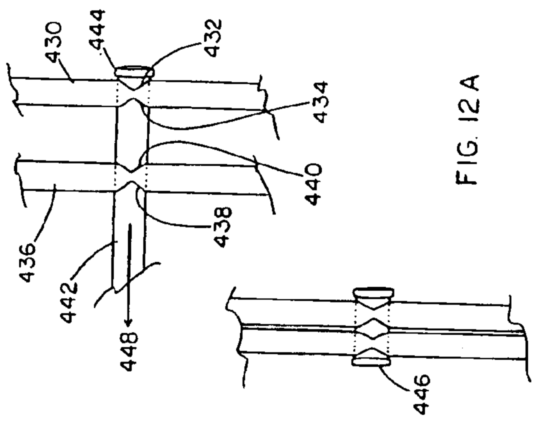
FIG. 12A is a side view of joined straws.

Referring now to FIG. 12A there is shown a view of joined straws. Straw 430 has holes or notches 432 and 434 through its sides. Straw 436 also has holes or notches 438 and 440 through its sides. Straw 442 may have rounded over end 444 and is inserted through straws 430 and 436 as shown in direction 448. Straw 442 may then be cut and rounded over end 446 to complete the joined assembly.

Referring now to FIG. 12B there is shown a view of joined straws. Straws 450 and 452 may be partially spiral cut as shown with their ends 454 and 456 intact as shown. End 456 may be collapsed as shown by hand or other means and may be pinched at that end to help it keep its crimped shape. Straws 450 and 452 may be joined as shown by axially inserting end 456 into end 454 as shown to form the joined straw ends 455.

Referring now to FIG. 12C there is shown a view of joined straws. Straw 458 has flared end 460 allowing straw 462 to be inserted as shown by pressing the straws axially together in directions 464 and 466 respectively as shown. Alternately, straw 462 could have a compressed or axially cut or crimped end allowing straw 458 to be inserted without a flared end.

Figure 12D:
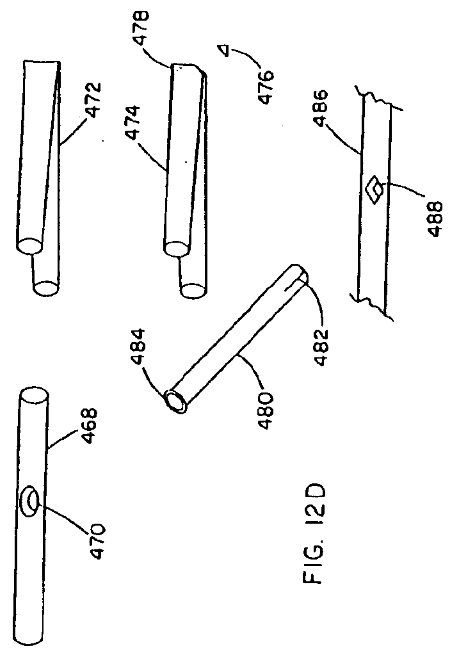
FIG. 12D is a view of cut straws.

Referring now to FIG. 12D there is shown a view of various cuts in straws. Straw 468 has hole or notch 470 through its body. Straw 472 is shown bent prior to a notch cut. Straw 474 is shown with notch 476 removed and with target notch 478 before cutting. Straw 480 is shown with axial cut or crimp 482 and rounded over end 484. Straw 486 is shown with notch or hole 488 through. Although the cuts shown are exemplary, more or less cuts or combinations could be provided in numerous combinations.

Referring now to FIG. 12E there is shown a view of a straw craft 490. Straw craft 490 is made from three straws 492, 494 and 496. Straw 492 has been spiral cut over substantially all of its length but with the ends 504 and 506 intact and not spiral cut. Straw 494 has axial cuts 498 and 500 with a hole or notches through at 502. The free ends 504 and 506 are slid over the axially cuts of straw 494 as shown resulting in the combination of straws 492 and 494 forming a loop. Straw 496 is also axially cut at 508 and 510 as shown and inserted into the hole or notches at 502 as shown. A free end 512 of straw 496 may be folded over and inserted in the interior of straw 496 in direction 514 resulting in completed end 516 as shown. Similarly, completed ends 518, 520 and 522 may be formed from the axial cuts. Although the cuts, the joining of the straws and the craft shown is exemplary, more or less cuts or combinations or joints could be provided in numerous combinations.

It should be understood that the foregoing description is only illustrative of the invention. Various alternatives and modifications can be devised by those skilled in the art without departing from the invention. Such an alternative or modification could be for example using a different shape other than a bore for a cutting guide; such shapes could include flat, straight or curved faces or otherwise be suitable for guiding a straw. Such a further alternative or modification could be incorporating, removing or combining features shown in alternative embodiments such as the slideable cutting edges, closed cutting guides, rounding mandrels or otherwise for example. Such a further alternative could be incorporating stops or calibration marks to any of the adjustable adaptations so that any particular settings may be repeatably returned to. Accordingly, the present invention is intended to embrace all such alternatives, modifications and variances which fall within the scope of the appended claims.

What is claimed is:

1. A hollow drinking straw cutting spiral cut craft tool comprising:

a housing for a hollow drinking straw having a cutting guide, the housing being sized and shaped for being handheld; and a cutting edge coupled to the housing, the cutting edge being one piece projecting into the cutting guide and being adapted to cut a spiral cut in hollow drinking straw;

wherein, the cutting guide is disposed to substantially surround the hollow straw inserted into the tool for supporting the straw to constrain the straw from lateral movement at the cutting edge, the cutting guide and cutting edge being arranged for allowing a user to select revolving either the cutting edge or the straw about a centerline of the straw to cut the spiral cut in the hollow straw; and the cutting edge and the cutting guide being non-movable relative to each other during the cutting, which includes inserting the hollow drinking straw into the cutting guide, the cutting, and the removal of the hollow drinking straw.

2. The straw cutting spiral cut craft tool of claim 1 wherein the cutting guide is further adapted to allow angle between the centerline and the cutting edge to vary while allowing either the cutting edge or the straw to be rotated about the centerline.

3. The straw cutting spiral cut craft tool of claim 1 further comprising a trimming edge coupled to the housing, wherein the trimming edge is adapted to cut a notch in straw.

4. The straw cutting spiral cut craft tool of claim 1 further comprising a trimming edge coupled to the housing, wherein the trimming edge is adapted to cut the straw axially.

5. The straw cutting spiral cut craft tool of claim 1 further comprising a rounding mandrel coupled to the housing, wherein the rounding mandrel is adapted to form an end which is rounded over on the hollow straw.

6. The straw cutting spiral cut craft tool of claim 1 further comprising a tapered portion coupled to the housing, wherein the tapered portion is adapted to flare an end of the hollow straw.

7. The straw cutting spiral cut craft tool of claim 1 wherein the cutting guide is open or may be opened to accept the hollow straw laterally into the cutting guide.

8. The straw cutting spiral cut craft tool of claim 1 wherein the hollow straw is a drinking straw with a diameter less than 12 mm.

9. The straw cutting spiral cut craft tool according to claim 1, wherein the housing is a molding at least in part.

10. The straw cutting spiral cut craft tool according to claim 1, wherein the housing is of unitary construction.

11. The straw cutting spiral cut craft tool according to claim 1, wherein the cutting edge is located in the housing for spiral cutting through a wall of the straw.

12. A straw cutting spiral cut craft tool comprising:

a housing having a cutting guide; and a cutting edge coupled to the housing, the cutting edge projecting into the cutting guide and being adapted to cut a spiral cut in the straw;

wherein, the cutting guide is adapted to constrain a hollow straw having a centerline from lateral movement at the cutting edge while allowing a user to select revolving, either the cutting edge or the straw about the centerline to cut the spiral cut in the straw, and the cutting guide has contact surfaces that channel the straw in a direction to the cutting edge, and wherein the cutting guide further comprises a secondary component slideably coupled to the housing, wherein the secondary component is movable relative to the contact surfaces that channel the straw to further guide the hollow straw to the cutting edge in a different direction, than the direction the straw is channeled by the cutting guide and wherein the angle between the cutting edge and the centerline is changeable when the secondary component is slid relative to the housing; and the cutting edge and the cutting guide being non-movable relative to each other during the cutting, which includes inserting the hollow drinking straw into the cutting guide, the cutting, and the removal of the hollow drinking straw.

13. A straw cutting spiral cut craft tool comprising:

a cutting guide adapted to constrain a hollow straw having a centerline from substantial lateral movement;

a cutting edge projecting into the cutting guide, the cutting guide guiding the hollow straw during insertion to the cutting edge; and a secondary component moveable relative to the cutting guide, the secondary component being adapted to further guide the hollow straw during straw insertion to the cutting edge;

wherein an angle between the straw and the cutting guide is changeable when the secondary component is moved relative to the cutting guide, wherein the cutting edge is adapted to cut a spiral cut in the hollow straw; and the cutting edge and the cutting guide being non-movable relative to each other during the cutting, which includes inserting the hollow drinking straw into the cutting guide, the cutting, and the removal of the hollow drinking straw.

14. The straw cutting spiral cut craft tool of claim 13 further comprising a trimming edge adapted to cut a notch in the straw.

15. The straw cutting spiral cut craft tool of claim 13 further comprising a trimming edge adapted to cut the straw axially.

16. The straw cutting spiral cut craft tool of claim 13 further comprising a rounding mandrel adapted to form an end which is rounded over on the hollow straw.

17. The straw cutting spiral cut craft tool of claim 13 further comprising a tapered portion adapted to flare an end of hollow straw.

18. The straw cutting spiral cut craft tool of claim 13 further comprising a stop, the stop being adapted to allow repeatable positioning of the secondary component relative to the cutting guide.

19. The straw cutting spiral cut craft tool of claim 13 wherein the cutting guide is open or may be opened to accept the hollow straw laterally into the cutting guide.

20. The straw cutting spiral cut craft tool of claim 13 wherein the cutting guide has a straw support surface shaped to complement an exterior circumference of a drinking straw with a diameter less than 12 mm.

21. A hollow drinking straw cutting spiral cut craft tool comprising:

a housing for a hollow drinking straw having a cutting guide, the housing being sized and shaped to be handheld; and a cutting edge coupled to the housing, the cutting edge projecting into the cutting guide and being adapted to cut a spiral cut in the hollow straw;

wherein, the cutting guide has a straw contact surface disposed to substantially surround the hollow straw inserted into the tool for supporting the straw to constrain the straw from lateral movement at the cutting edge, the cutting guide and cutting edge being arranged for allowing a user to select revolving either the cutting edge or the straw about a centerline of the straw to cut the spiral cut, and wherein the cutting guide is open or may be opened to accept the hollow straw laterally into the cutting straw; and the cutting edge and the cutting guide being non-movable relative to each other during the cutting, which includes inserting the hollow drinking straw into the cutting guide, the cutting, and the removal of the hollow drinking straw.

22. The straw cutting spiral cut craft tool of claim 21 wherein the cutting guide further comprises a secondary component slideably coupled to the housing, wherein the secondary component is adapted to further guide the hollow straw and wherein an angle between the cutting edge and the centerline is changeable when the secondary component is slid relative to the housing.

23. The straw cutting spiral cut craft tool of claim 21 further comprising a trimming edge coupled to the housing, wherein the trimming edge is adapted to cut a notch in straw.

24. The straw cutting spiral cut craft tool of claim 21 further comprising a trimming edge coupled to the housing, wherein the trimming edge is adapted to cut the straw axially.

25. The straw cutting spiral cut craft tool of claim 21 further comprising a rounding mandrel coupled to the housing, wherein the rounding mandrel is adapted to form an end which is rounded over on the hollow straw.

26. The straw cutting spiral cut craft tool of claim 21 further comprising a tapered portion coupled to the housing, wherein the tapered portion is adapted to flare an end of the hollow straw.

27. The straw cutting spiral cut craft tool of claim 21 wherein the surface of the cutting guide complements a 12 mm or less diameter hollow straw.

28. The straw cutting spiral cut craft tool according to claim 21, wherein the housing is of unitary construction.

29. The straw cutting spiral cut craft tool according to claim 21, wherein the housing is a molding.

30. The straw cutting spiral cut craft tool according to claim 21, wherein the cutting edge is located in the housing for spiral cutting through a wall of the straw.

* * * * *

UNITED STATES PATENT AND TRADEMARK OFFICE
CERTIFICATE OF CORRECTION

PATENT NO. : 6,935,030 B2 Page 1 of 1
DATED : August 30, 2005
INVENTOR(S) : James Loik It is certified that error appears in the above-identified patent and that said Letters Patent is hereby corrected as shown below:

<u>Column 14,</u>
Line 25, change "straw" to -- guide. --.

Signed and Sealed this

Seventh Day of February, 2006

JON W. DUDAS
*Director of the United States Patent and Trademark Office*

UNITED STATES PATENT AND TRADEMARK OFFICE

CERTIFICATE OF CORRECTION

PATENT NO. : 6,935,030 B2
APPLICATION NO. : 10/027695
DATED : August 30, 2005
INVENTOR(S) : James Loik It is certified that error appears in the above-identified patent and that said Letters Patent is hereby corrected as shown below:

Claim 21, line 25, should read:

the cutting guide; and the cutting edge and the cutting

Signed and Sealed this

First Day of August, 2006

JON W. DUDAS

*Director of the United States Patent and Trademark Office*